United States Patent
Kim

(10) Patent No.: US 8,046,125 B2
(45) Date of Patent: Oct. 25, 2011

(54) METHOD FOR DETERMINING OPTIMAL OPERATION POINT WITH RESPECT TO STATE OF CHARGE IN HYBRID ELECTRIC VEHICLE

(75) Inventor: Yong Gi Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 729 days.

(21) Appl. No.: 12/152,978

(22) Filed: May 19, 2008

(65) Prior Publication Data

US 2009/0157244 A1    Jun. 18, 2009

(30) Foreign Application Priority Data

Dec. 13, 2007  (KR) .................. 10-2007-0129908

(51) Int. Cl.
   *G05D 3/00* (2006.01)
(52) U.S. Cl. .......... 701/22; 320/132; 320/136; 903/903; 180/65.21; 180/65.29
(58) Field of Classification Search ............ 701/22; 320/104, 132, 136; 903/903; 180/65.21, 180/65.1, 65.29, 65.31
   See application file for complete search history.

(56) References Cited

U.S. PATENT DOCUMENTS

| 2004/0119441 | A1* | 6/2004 | Koo ............... 320/104 |
| 2010/0038159 | A1* | 2/2010 | Jinno et al. ....... 180/65.265 |

FOREIGN PATENT DOCUMENTS

| JP | 11-093722 | 4/1999 |
| JP | 11-324751 | 11/1999 |
| JP | 2000-236601 | 8/2000 |
| JP | 2000-337187 A | 12/2000 |
| JP | 2004-332661 | 11/2004 |
| KR | 1020050036525 | 4/2004 |
| KR | 1020050061792 | 6/2005 |

* cited by examiner

*Primary Examiner* — Gertrude Arthur Jeanglaude
(74) *Attorney, Agent, or Firm* — Edwards Angell Palmer & Dodge LLP; Peter F. Corless

(57) ABSTRACT

The present invention provides a method for determining an optimal operation point with respect to SOC in a hybrid electric vehicle, in which, as a conversion factor (fuel equivalent factor) that can quantitatively compare the amount of fuel consumed by an engine with electrical energy consumed by a motor, a factor for obtaining a desired final SOC with respect to an initial SOC is determined, and an optimal operation state based on a current SOC of the hybrid electric vehicle is determined using the factor, thus improving fuel efficiency of the hybrid electric vehicle.

4 Claims, 3 Drawing Sheets

<SOC determination>

METHOD FOR DETERMINING OPTIMAL OPERATION POINT WITH RESPECT TO STATE OF CHARGE IN HYBRID ELECTRIC VEHICLE

CROSS-REFERENCE TO RELATED APPLICATION

This application claims under 35 U.S.C. §119(a) the benefit of Korean Patent Application No. 10-2007-0129908 filed Dec. 13, 2007, the entire contents of which are incorporated herein by reference.

BACKGROUND (a) Technical Field

The present invention relates to a method for determining an optimal operation point with respect to state of charge (SOC) in a hybrid electric vehicle, which can improve fuel efficiency of the hybrid electric vehicle.

(b) Background Art

Recently, the demand for environment-friendly vehicles has been increased according to the demand for improved fuel efficiency and the stringency of exhaust emission regulations, and thus hybrid vehicles have attracted much attention as a practical alternative.

The hybrid vehicle is defined as a vehicle driven using two power sources, in which a high voltage battery is used as an energy storage device.

The hybrid vehicle includes, as driving power sources, an engine and a motor operatively connected to the engine. It also includes a clutch and a transmission (CVT) for transmitting the driving power, an inverter, a DC/DC converter and a high voltage battery for driving the engine and the motor. In addition, it includes a hybrid control unit (HCU), a motor control unit (MCU) and a battery management system (BMS), which are communicatably connected to each other through a CAN communication.

The high voltage battery is an energy source for driving the motor and the DC/DC converter of the hybrid vehicle, and the BMS for controlling the high voltage battery serves to control the SOC of the high voltage battery by monitoring the voltage, current and temperature of the high voltage battery.

Properly controlling the SOC of the high voltage battery is critically important to safely and effectively operate the high voltage and high capacity battery.

Simply reducing or increasing the use of the motor according to low or high SOC of the battery does not provide an optimal fuel efficiency. There is a need for a new operation strategy that can consider the high or low SOC of the battery and, at the same time, achieve an optimal fuel efficiency level.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. One of the objects of the present invention is provide a method for determining an optimal operation point with respect to SOC in a hybrid electric vehicle, in which, as a conversion factor (fuel equivalent factor) that can quantitatively compare the amount of fuel consumed by an engine with electrical energy consumed by a motor, a factor for obtaining a desired final SOC with respect to an initial SOC is determined, and an optimal operation state based on a current SOC of the hybrid electric vehicle is determined using the factor, thus improving fuel efficiency of the hybrid electric vehicle.

In one aspect, the present invention provides a method for determining an optimal operation point with respect to SOC in a hybrid electric vehicle, the method comprising: receiving a driver demand; determining a current operation state by detecting a current vehicle speed, a driver demand power, and a current SOC; determining a class of SOC based on the current operation state; determining, from a map in which a whole operable range of the engine is arranged, a plurality of candidate engine operation points and a plurality of motor operation points corresponding to the respective candidate engine operation points according to the determined class of SOC; calculating operation costs for the plurality of candidate engine operation points and corresponding motor operation points; determining an operation point at which the engine and the motor can operate at the lowest cost; and applying an output command to the engine and the motor based on the determined operation point.

Preferably, in determining the class of SOC, the SOC is classified into a normal SOC, a high SOC, a very high SOC, a low SOC, and a very low SOC and determined according to a given hysteresis.

Also preferably, in calculating costs for the plurality of candidate engine operation points and corresponding motor operation points, the costs are calculated by the following formula:

$$\text{cost}_i \approx fc_i + F.E.F \cdot p_{bat,i}$$

where $\text{cost}_i$ represents a cost at time i (equalized fuel consumption rate) (g/sec), FEF represents a fuel equivalent factor (g/s/W), and $P_{bat,i}$ represents a battery power at time i (W).

Suitably, the fuel equivalent factor is obtained by equalizing the amount of electrical energy of the battery to a fuel consumption rate ($fC_i$).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
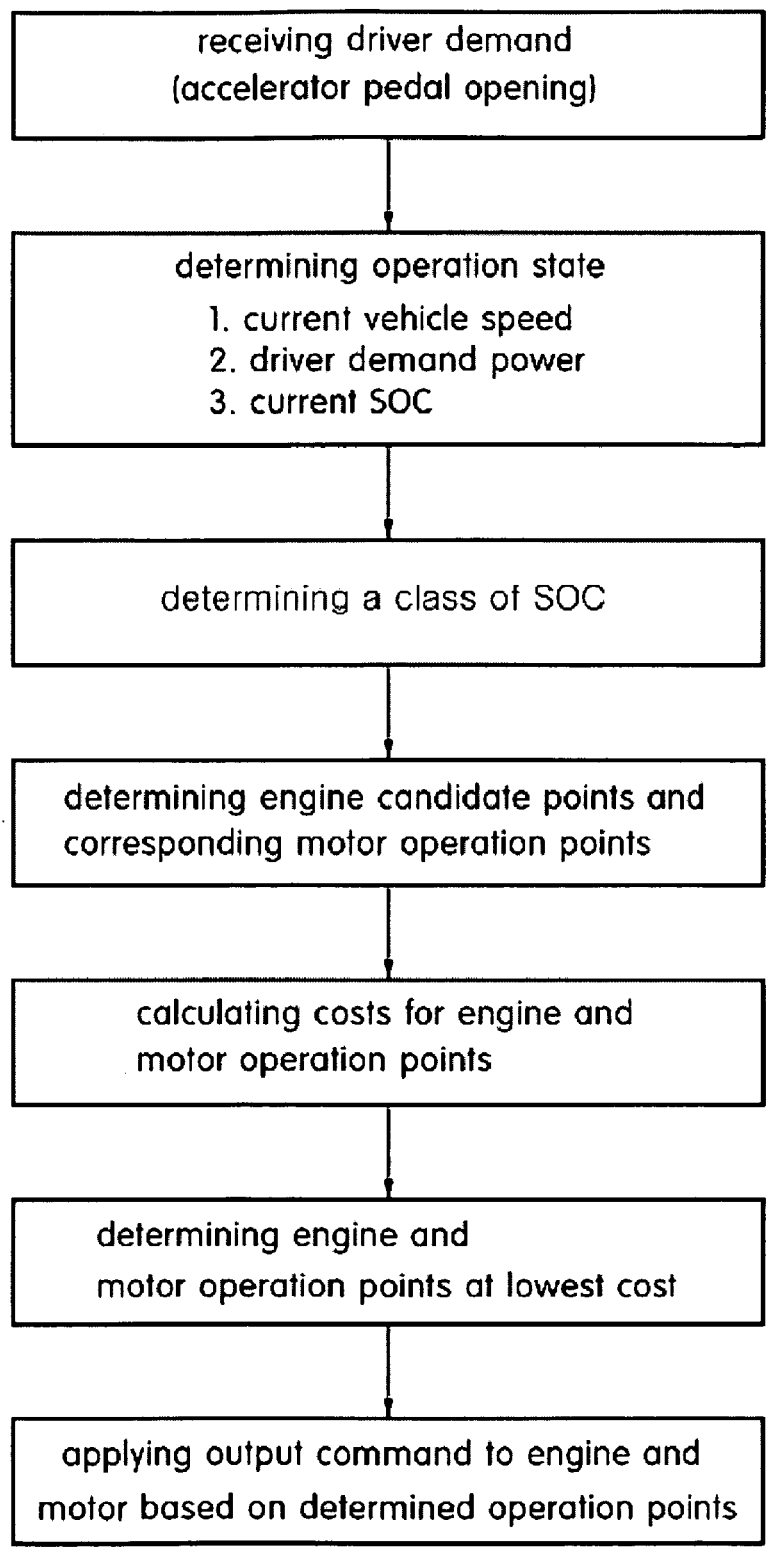
FIG. 1 is a flowchart illustrating a method for determining an optimal operation point with respect to SOC in a hybrid electric vehicle in accordance with the a preferred embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

As discussed above, in one aspect, the present invention provides a method for determining an optimal operation point with respect to SOC in a hybrid electric vehicle, the method comprising: receiving a driver demand (accelerator pedal opening); determining a current operation state by detecting a current vehicle speed, a driver demand power, and a current SOC; determining a class of SOC based on the current operation state; determining, from a map in which a whole operable range of the engine is arranged, a plurality of candidate engine operation points and a plurality of motor operation points corresponding to the respective candidate engine operation points according to the determined class of SOC; calculating costs for the plurality of candidate engine operation points and corresponding motor operation points; determining engine and motor operation points at which the engine and the motor can operate at the lowest cost; and applying an output command to the engine and the motor based on the determined engine and motor operation points.

It is to be understood that the method for determining an optimal operation point in accordance with the present invention is applicable to a hard type hybrid electric vehicle as well as a soft type hybrid electric vehicle.

Also it will be understood that the control for the determination of an optimal operation point in accordance with the present invention is made by signal transmission between a hybrid control unit (HCU), a motor control unit (MCU) and a battery management system (BMS).

One of the key features of the present invention, as detailed below, is to use a fuel equivalent factor, which can convert the amount of fuel consumption (fuel consumption rate) by engine from or to that of electrical energy by motor, to determine an optimal operation point based on a current SOC, thereby improving fuel efficiency of the hybrid electric vehicle.

First, an optimization formula, as shown below, with respect to a fuel consumption amount of a hybrid vehicle can be obtained based on a driving mode of a given vehicle (vehicle speed profile with respect to time).

$$FC = \int_{cycle} fc(t)\,dt \cong \sum_i fc_i$$

provided, $SOC_{final} - SOC_{target} \cong 0$ provided,
where,
FC represents a fuel consumption amount (g);
$fC_i$ represents a fuel consumption rate at time i (g/sec);
$SOC_{final}$ represents a final SOC in a driving mode (%);
$SOC_{target}$ represent a target SOC in the driving mode (%); and
$SOC_{initial}$ represents an initial SOC in the driving mode (%), which can be classified into $SOC_{target}$ in case of a normal SOC, $SOC_{high}$ in case of a high SOC, and $SOC_{low}$ in case of a low SOC wherein $SOC_{high}$ represents a high SOC reference value, and $SOC_{low}$ represent a low SOC reference value.

Here, as a method for satisfying the conditions above and, at the same time, minimizing the fuel consumption amount (fuel efficiency), i.e., a formula for calculating operation points at which the engine and the motor can operate at the lowest cost can be expressed by the following formula, which includes the fuel equivalent factor.

$$cost_i \cong fc_i + F.E.F \cdot p_{bat,i}$$

where,
$cost_i$ represents a cost at time i (equalized fuel consumption rate) (g/sec);
FEF represents a fuel equivalent factor (g/s/W), which can be classified into $FEF_{normal}$ in case of a normal SOC, $FEF_{high}$ in case of a high SOC, and $FEF_{low}$ in case of a low SOC; and
$P_{bat,i}$ represents a battery power at time i (W).

An engine BSFC map, in which the whole operable range of the engine is arranged, e.g., in a grid pattern, is formed. From the map, a plurality of candidate engine and motor operation points are determined with respect to each of the SOCs. Based on the above mathematical formulas, it is possible to obtain an optimal operation point which can minimize operation costs, thereby improving fuel efficiency.

The method for determining an optimal operation point will be described in more detail below.

First, based on a driver demand (e.g., accelerator pedal opening), a current operation state of the vehicle is determined by detecting a current vehicle speed, a driver demand power, and a current SOC.

Subsequently, based on the current operation state, a class of SOC is determined according to a given hysteresis. For instance, the class of SOC can be classified into a normal SOC, a high SOC, a very high SOC, a low SOC, and a very low SOC.

After the class of SOC is determined, a plurality of candidate engine operation points and a plurality of motor operation points corresponding to the respective candidate engine operation points are determined from the map in which the whole operable range of the engine is arranged.

Thereafter, costs for the respective engine and motor operation points are calculated and the operation point at which the engine and the motor can operate at the lowest cost is determined.

Figure 2:
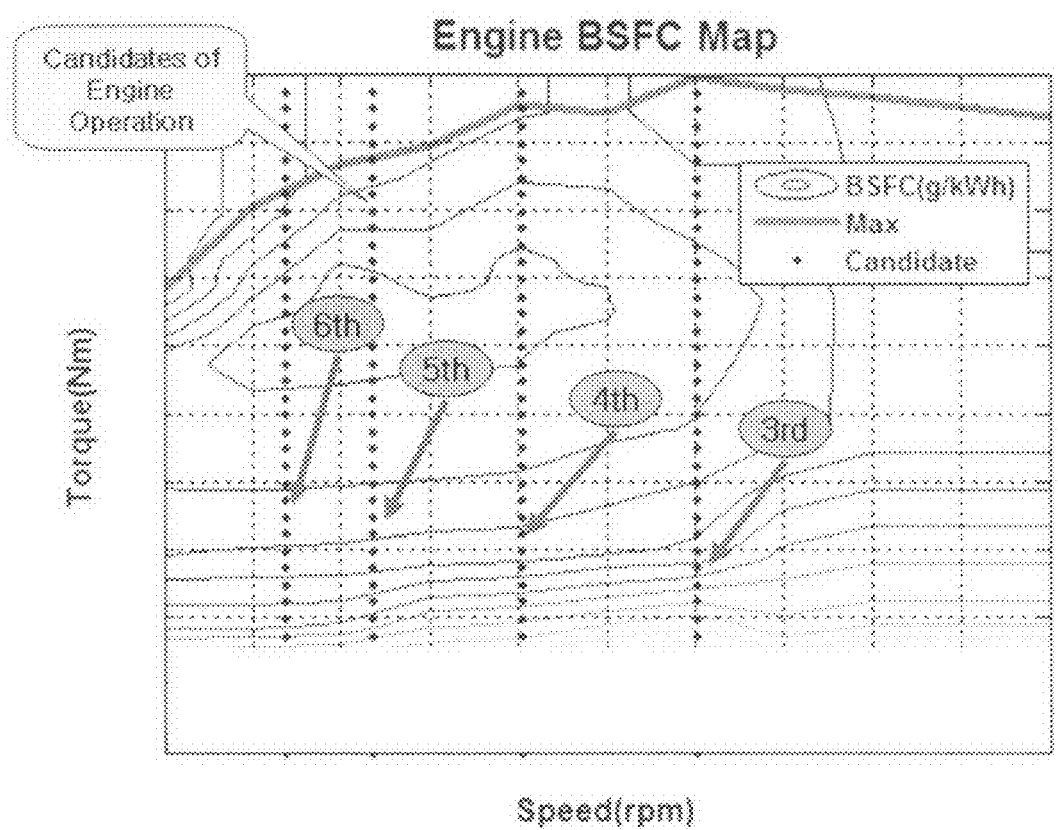
FIG. 2 is a map used in the method for determining an optimal operation point with respect to SOC in a hybrid electric vehicle in accordance with the preferred embodiment of the present invention.
Figure 3:
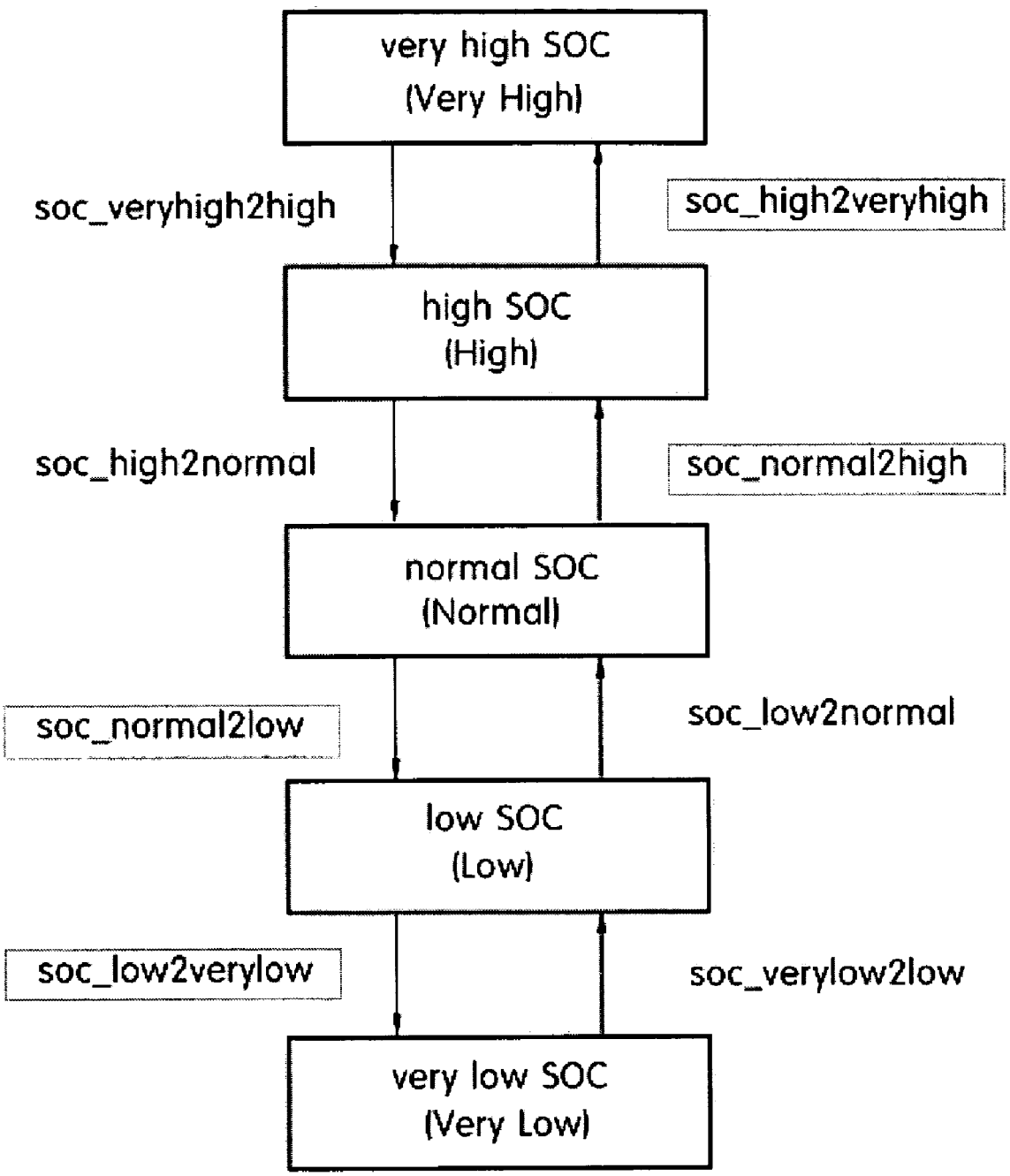
FIG. 3 is a diagram illustrating an SOC determination process in the method for determining an optimal operation point with respect to SOC in a hybrid electric vehicle in accordance with the preferred embodiment of the present invention.

For example, in case of the normal SOC, if the current vehicle speed is 60 km/h and the driver demands a motor power of about 30 kW, as shown FIG. 2, a plurality of candidate engine operation points are extracted to determine the motor operation points corresponding to the respective candidate engine operation points. The operation point(s) at which the engine and the motor can operate at the lowest cost can then be determined according to the above mathematical formulas.

That is, by carrying out an operation for adding an engine fuel consumption rate at time i ($fC_i$) to a fuel equivalent factor (g/s/W), in which the amount of electrical energy of the battery is equalized to the fuel consumption rate ($fC_i$) with respect to the plurality of candidate engine and motor operation points, it is possible to determine the operation point(s) at which the engine and motor can operate at the lowest cost.

For a very high SOC, high SOC, low SOC, or very low SOC, it is possible to determine the optimal engine and motor operation point(s) in the same manner as above.

Consequently, an output command is applied to the engine and the motor based on the determined optimal operation point(s) at which the operation cost is minimized.

As described above, the present invention provides advantages including the following: The fuel equivalent factor obtained by equalizing the amount of electrical energy of the battery to the fuel consumption rate is used to calculate the costs for the respective operation points of the engine and the motor according to the change in SOC step by step, thus determining the optimal operation points at which the engine and the motor can operate at the lowest cost to thereby improve the fuel efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for determining an optimal operation point with respect to state of charge (SOC) of an engine in a hybrid electric vehicle, the method comprising:
   receiving a driver demand;
   determining a current operation state by detecting a current vehicle speed, a driver demand power, and a current SOC;
   determining a class of SOC associated with the hybrid electric vehicle based on the current operation state;
   determining, from a map in which a whole operable range of the engine is arranged, a plurality of candidate engine operation points and a plurality of motor operation points corresponding to the respective candidate points according to the determined class of SOC;
   calculating operation costs for the plurality of candidate engine operation points and the corresponding motor operation points;
   determining an optimal operation point at which the engine and the motor can operate at the lowest cost; and
   applying an output command to the engine and the motor based on the determined optimal operation point.

2. The method of claim 1, wherein, in determining the class of SOC, the SOC is classified into a normal SOC, a high SOC, a very high SOC, a low SOC, and a very low SOC and determined according to a given hysteresis.

3. The method of claim 1, wherein, in calculating costs for the plurality of candidate engine operation points and the corresponding motor operation points, the costs are calculated by the following formula:

$$cost_i \approx fc_i + F.E.F \cdot p_{bat,i}$$

where $cost_i$ represents a cost at time i (equalized fuel consumption rate) (g/sec), FEF represents a fuel equivalent factor (g/s/W), and $P_{bat,i}$ represents a battery power at time i (W).

4. The method of claim 3, wherein the fuel equivalent factor is obtained by equalizing the amount of electrical energy of the battery to a fuel consumption rate (fCi).

* * * * *